United States Patent
Slepon (10) Patent No.: US 9,229,876 B2
(45) Date of Patent: Jan. 5, 2016

(54) METHOD AND SYSTEM FOR DYNAMIC COMPRESSION OF ADDRESS TABLES IN A MEMORY

(71) Applicant: SanDisk Technologies Inc., Plano, TX (US)

(72) Inventor: Raphael Slepon, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 82 days.

(21) Appl. No.: 14/274,310

(22) Filed: May 9, 2014

(65) Prior Publication Data

US 2015/0169465 A1 Jun. 18, 2015

Related U.S. Application Data

(60) Provisional application No. 61/917,168, filed on Dec. 17, 2013.

(51) Int. Cl.
| | |
|---|---|
| *G06F 12/02* | (2006.01) |
| *G06F 12/10* | (2006.01) |
| *G06F 3/06* | (2006.01) |

(52) U.S. Cl.
CPC .......... *G06F 12/1009* (2013.01); *G06F 3/061* (2013.01); *G06F 3/0659* (2013.01); *G06F 3/0679* (2013.01); *G06F 12/0246* (2013.01); *G06F 2212/401* (2013.01); *G06F 2212/657* (2013.01); *G06F 2212/7201* (2013.01)

(58) Field of Classification Search
CPC .......... G06F 12/1009; G06F 12/0246; G06F 2212/401; G06F 2212/657; G06F 2212/7201

USPC .................................................. 711/103, 206
See application file for complete search history.

(56) References Cited

U.S. PATENT DOCUMENTS

| | | |
|---|---|---|
| 5,630,093 A | 5/1997 | Holzhammer et al. |
| 7,975,109 B2 | 7/2011 | McWilliams et al. |
| 2007/0005929 A1 | 1/2007 | Post et al. |
| 2011/0022819 A1* | 1/2011 | Post et al. ............... 711/207 |
| 2014/0075098 A1* | 3/2014 | Uno ........................ 711/103 |
| 2014/0136810 A1* | 5/2014 | Colgrove et al. ........ 711/206 |
| 2014/0208004 A1* | 7/2014 | Cohen et al. ............ 711/103 |
| 2015/0100721 A1* | 4/2015 | Koseki ..................... 711/103 |
| 2015/0154118 A1* | 6/2015 | Marcu et al. ............ 711/206 |
| 2015/0212936 A1* | 7/2015 | Flynn et al. ............. 711/103 |

OTHER PUBLICATIONS

U.S. Appl. No. 13/773,946, filed Feb. 22, 2013 (34 pages).

* cited by examiner

*Primary Examiner* — Than Nguyen
(74) *Attorney, Agent, or Firm* — Brinks Gilson & Lione (57) ABSTRACT

A method and system are disclosed for handling logical-to-physical mapping and increasing the amount of mapping table information that may be stored in a cache in volatile memory. The method includes the storage device storing in fast access memory, such as RAM, a copy of only a portion of the complete mapping information for non-volatile memory of the storage device using a compressed format by compressing the mapping data when a skip pattern of interleaved sequential writes to non-volatile memory are found in the mapping information. The system includes a storage device having volatile memory, non-volatile memory and a controller in communication with the volatile and non-volatile memory that is configured to carry out the method noted above.

14 Claims, 8 Drawing Sheets

METHOD AND SYSTEM FOR DYNAMIC COMPRESSION OF ADDRESS TABLES IN A MEMORY

CROSS-REFERENCE TO RELATED APPLICATIONS

This application claims the benefit of U.S. Provisional Application No. 61/917,168, filed Dec. 17, 2013, the entirety of which is hereby incorporated herein by reference.

TECHNICAL FIELD

This application relates generally to a method and system for managing the storage of data in a data storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "pages" that can be written, and groups of pages called "blocks" that can be read and erased, by a storage manager often residing in the memory system.

In a SSD or other non-volatile memory storage there is a mapping table or other data structure that typically stores a map of all logical addresses to physical addresses. When data is written to a flash memory, the mapping table or other data structure that tracks the location of data in the flash memory must be updated. The time involved in updating data structures for file systems to reflect changes to files and directories, and accessing these data structures, may affect the performance of the storage device. Typically, runs of logical addresses exist which are written at the same time to contiguous runs of physical addresses, but the memory system should to be able to handle worst case scenarios where no contiguous runs exist and each logical address is mapped to randomly to different physical addresses.

Thus, in SSDs or other non-volatile memory storage devices, a fine granularity mapping table is required to allow best write performance. This table can typically be very large. The full table or subparts of it are generally required to perform read and write tasks so it is desirable to store a working copy in random access memory (RAM) to ease random read and write overhead. It may not be economically feasible or technologically viable to use a RAM sufficiently large to hold the entire table. However, if the entire mapping table is not held in RAM then read and write performance may slow down and write wear may increase in any flash memory that is used to hold portions of the mapping table that is not held in the RAM.

BRIEF SUMMARY

In order to address the problems and challenges noted above, a system and method for handling logical-to-physical mapping in a non-volatile memory system is disclosed.

According to a first aspect, method is disclosed where, in a memory device having a non-volatile memory, a volatile memory and a controller in communication with the non-volatile memory and the volatile memory, the controller receives a host command identifying a logical block address for data stored in non-volatile memory of the memory device. The controller determines if mapping information regarding a physical address in the non-volatile memory associated with the logical block address resides in the volatile memory. When no mapping information associated with the logical block address resides in the volatile memory, the controller retrieves a segment of mapping information from a logical-to-physical mapping structure in the non-volatile memory, where the segment is associated with the logical block address in the host command. The retrieved segment is compressed into a compressed logical group address entry based on a logical address skip pattern in physical address entries associated in the segment and stored in the volatile memory.

The logical address skip pattern looked for by the controller may relate to sequential runs of host data that are written to the non-volatile memory in an interleaved pattern on a plane or die level so that the mapping information includes a plurality of groups of sequential runs of logical addresses associated with sequential physical addresses in a first row of the segment that is contiguous with a second plurality of groups of sequential runs of logical addresses associated with sequential physical addresses in a second row of the segment.

According to another aspect, a memory device is disclosed having a volatile memory, a non-volatile memory and a controller in communication with the volatile and non-volatile memories and configured to execute the skip pattern compression of mapping information copied into volatile memory as set forth above.

Other embodiments are disclosed, and each of the embodiments can be used alone or together in combination. The embodiments will now be described with reference to the attached drawings.

DETAILED DESCRIPTION

Figure 1:
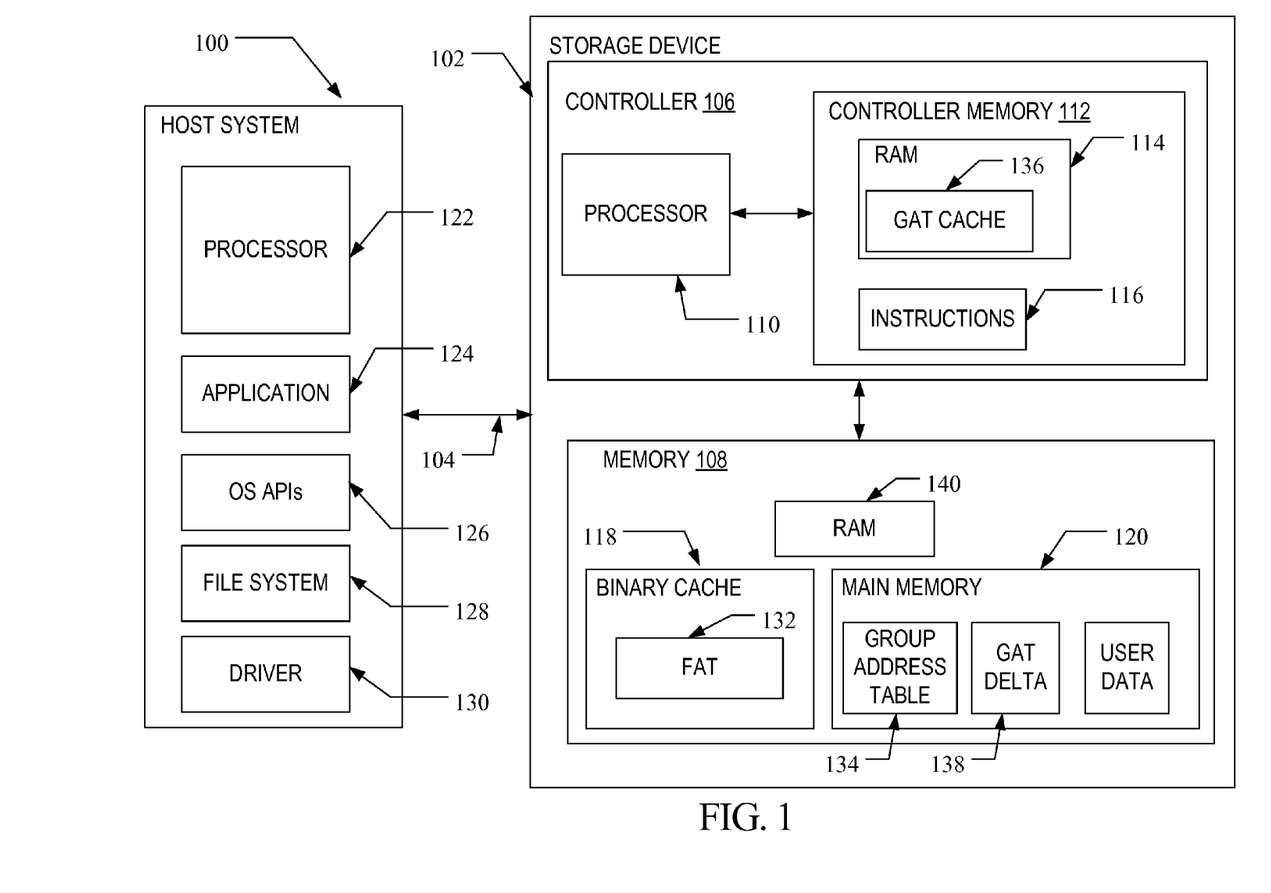
FIG. 1 illustrates a block diagram of host and storage device according to one embodiment.

A flash memory system suitable for use in implementing aspects of the invention is shown in FIG. 1. A host system 100 stores data into, and retrieves data from, a storage device 102.

The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data generating devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as random access memory (RAM) 114 and/or non-volatile memory, and processor executable instructions 116 for handling memory management. The RAM 114 may include one or more of any of a number of types of RAM, such as static RAM (SRAM) or dynamic RAM (DRAM).

As discussed in more detail below, the storage device 102 may include functions for memory management. In operation, the processor 110 may execute memory management instructions (which may be resident in instructions 116) for operation of memory management functions. The memory management functions may control the assignment of the one or more portions of the memory 108 within storage device 102.

The memory 108 may include non-volatile memory (such as flash memory). One or more memory types may be included in memory 108. The memory may include cache storage (also referred to as binary cache) 118 and main memory (also referred to as long term memory) 120. In embodiments where the memory 108 includes flash memory as non-volatile memory, the binary cache and main memory may be made up of the same type of flash memory cell or different types of flash memory cells. For example, the cache storage 118 may be configured in a single level cell (SLC) type of flash configuration having a one bit per cell capacity while the long term storage 120 may consist of a multi-level cell (MLC) type flash memory configuration having two or more bit per cell capacity to take advantage of the higher write speed of SLC flash and the higher density of MLC flash. Different combinations of flash memory types are also contemplated for the cache storage 118 and long term storage 120. Additionally, the memory 108 may also include volatile memory such as any of a number of forms of random access memory (RAM) 140.

The binary cache 118 and main storage 120 of memory 108 may include physical blocks of flash memory that each consists of a group of pages, where a block is a group of pages and a page is a smallest unit of writing in the memory. The physical blocks in the memory include operative blocks that are represented as logical blocks to the file system 128. The storage device 102 may be in the form of a portable flash drive, an integrated solid state drive or any of a number of known flash drive formats. In yet other embodiments, the storage device 102 may include only a single type of flash memory having one or more partitions.

Referring again to FIG. 1, the host 100 may include a processor 122 that runs one or more application programs 124. The application programs 124, when data is to be stored on or retrieved from the storage device 102, communicate through one or more operating system application programming interfaces (APIs) 126 with the file system 128. The file system 128 may be a software module executed on the processor 122 and manages the files in the storage device 102. The file system 128 manages clusters of data in logical address space. Common operations executed by a file system 128 include operations to create, open, write (store) data, read (retrieve) data, seek a specific location in a file, move, copy, and delete files. The file system 128 may be circuitry, software, or a combination of circuitry and software.

Accordingly, the file system 128 may be a stand-alone chip or software executable by the processor of the host 100. A storage device driver 130 on the host 100 translates instructions from the file system 128 for transmission over a communication channel 104 between the host 100 and storage device 102. The interface for communicating over the communication channel 104 may be any of a number of known interfaces, such as SD, MMC, USB storage device, SATA and SCSI interfaces. A file system data structure 132, such as a file allocation table (FAT), may be stored in the memory 108 of the storage device 102. The host 100 utilizes the file system data structure to maintain a logical address range 202 for all logical block addresses (LBAs) that have been assigned by the host system 10 to data. Although shown as residing in the binary cache portion 118 of the memory 108, the file system data structure 132 may be located in the main memory 120 or in another memory location on the storage device 102.

In addition to the user data and host-generated file system data structures that may be stored in flash memory on the storage device 102, the storage device itself stores and maintains a logical-to-physical mapping table or other data structure that tracks the logical addresses supplied by the host file system and the physical addresses where the storage device is keeping the data. A primary logical-to-physical mapping table, sometimes referred to as a group address table (GAT) 134 may be stored in main memory 120. A copy of a portion of the GAT 134 may be cached in RAM 114 in the storage device 102 as a GAT Cache 136 for faster access to the logical-to-physical mapping information.

Figure 2:
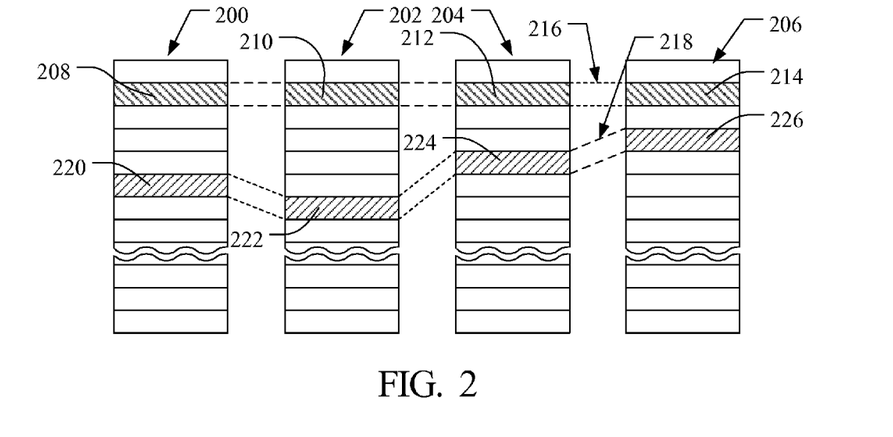
FIG. 2 illustrates an example physical memory organization of the memory in the storage device of FIG. 1.

Referring to FIG. 2, the binary cache and main memories 118, 120 (e.g. SLC and MLC flash respectively) may be arranged in blocks of memory cells. In the example of FIG. 2, four planes or sub-arrays 200, 202, 204 and 206 memory cells are shown that may be on a single integrated memory cell chip, on two chips (two of the planes on each chip) or on four separate chips. Other numbers of planes may exist in a system. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
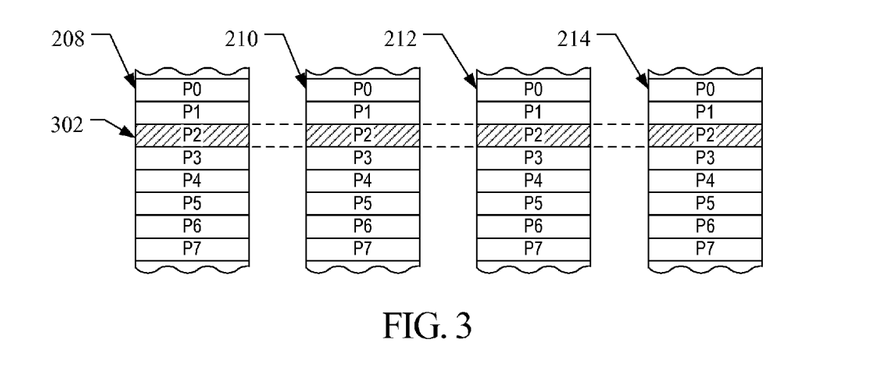
FIG. 3 shows an expanded view of a portion of the physical memory of FIG. 2.

The individual blocks are in turn divided for operational purposes into pages of memory cells, as illustrated in FIG. 3. The memory cells of each of blocks 208, 210, 212 and 214, for example, are each divided into eight pages P0-P7. Alternately, there may be 16, 32 or more pages of memory cells within each block. A page is the unit of data programming and reading within a block, containing the minimum amount of data that are programmed or read at one time. A metapage 302 is illustrated in FIG. 3 as formed of one physical page for each of the four blocks 208, 210, 212 and 214. The metapage 302 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 100. The LBAs are then mapped to one or more physical blocks in the storage device 102 where the data is physically stored.

Figure 4:
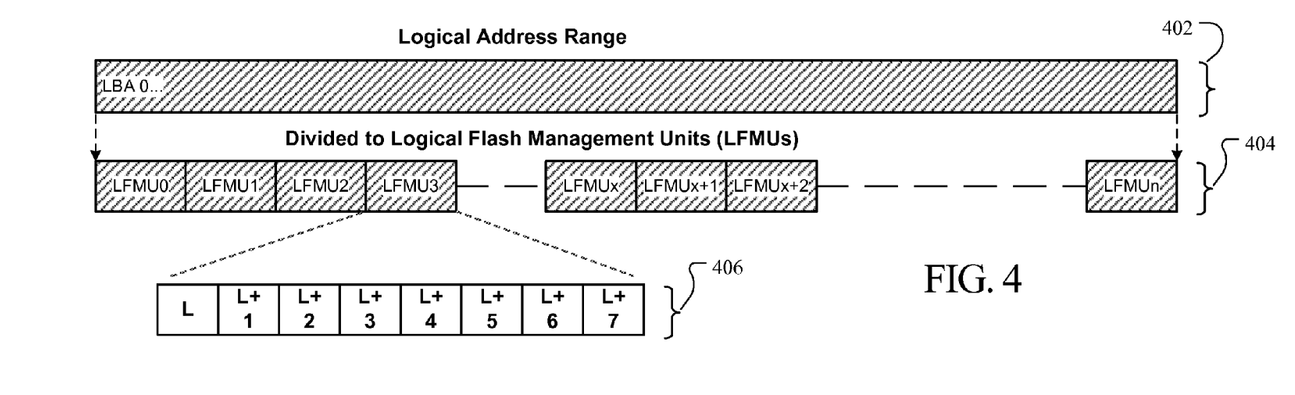
FIG. 4 illustrates an embodiment of logical space managed by the host and logical flash management units handled within the storage device.

An update mapping table or data structure may be maintained to handle updates to the memory that have not yet had time to be transferred to the primary mapping table. For example, a group address table "delta," also referred to as a GAT delta 138 may include updates to the GAT 134 that have not yet had time to be stored in the GAT 134. When the memory 108 includes a binary cache 118, the GAT 134 and GAT cache 136 also track any data stored in the binary cache 118 that have not yet been stored in the main memory 120. Referring now to FIG. 4, an example logical address range 402 for logical block addresses (LBAs) assigned by the host system 100 to data is shown. These LBAs are grouped into equal sized logical flash management units (LFMUs or logical units) 404. In one implementation, the LFMUs 402 may each include 8 sequential and contiguous LBAs 406, and the LBA range 402 is divided into a whole number of LFMUs 404. As part of the process of writing and erasing data having LBAs that fall within specific LFMUs 404, certain fragments of LFMUs may be written into the binary cache 118 portion of the flash memory 108 rather than to the main storage 120 portion of the flash memory 108, a mapping table such as the GAT 134 is necessary to track what physical addresses in non-volatile memory have been assigned to which logical addresses. The GAT 134 may be kept in main memory 120. The GAT pages provide the logical to physical mapping for logical units of data. As noted previously, a copy of some of the GAT pages may also be cached in RAM 114 in the storage device 102. The cached GAT pages point to the physical locations for the update or intact blocks in binary cache 118 or main storage 120 flash memory for each of the respective LFMUs.

A storage device 102 may typically respond to a host query regarding data associated with logical addresses by methodically first retrieving and parsing the GAT table from main storage and/or RAM, respectively. If space and cost issues permitted a large amount of volatile memory (e.g. RAM 114 in the controller 106), one way to maintain a GAT 134 of all logical to physical address relationships in the storage device is to maintain the entire table in flash memory (such as NAND flash) and to then copy the entire table into fast access memory such as the RAM 114 in the controller 106 of the storage device 102. In some storage device architectures a limited amount of RAM is available, where the RAM space is needed both to cache data written to or read from the NAND flash and to handle mapping table data, and the RAM 114 is not big enough to hold the entire mapping table.

Figure 5:
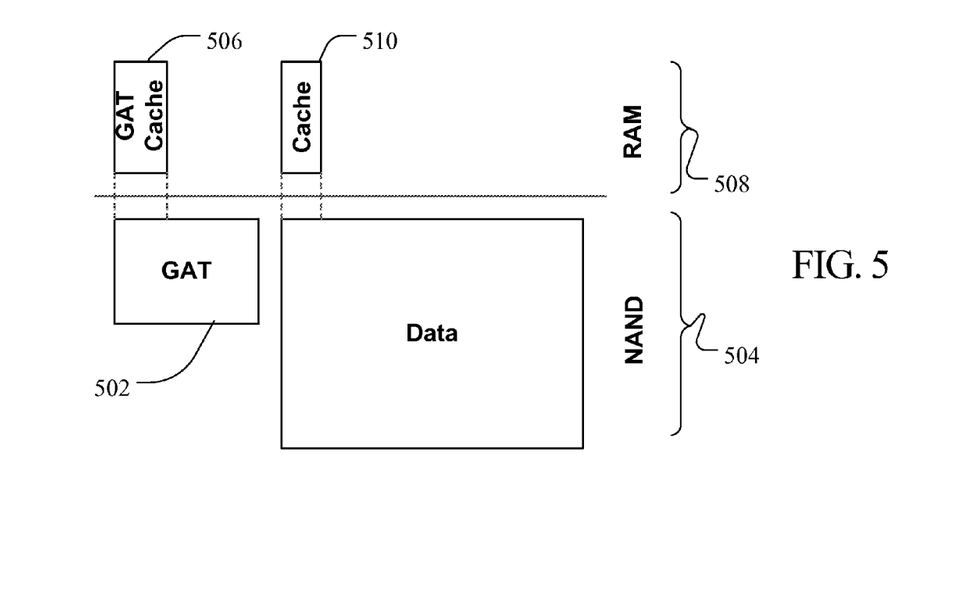
FIG. 5 illustrates an example of a storage device having a mapping table and user data in NAND and a copy of a portion of the mapping table and user data in controller RAM of the storage device.

A simplified version of the memory 102 is shown in FIG. 5 to illustrate a storage device where there is reduced space available in fast access media as compared to the non-volatile media. Specifically, in this architecture the GAT 502 and user data 508 mapped by the GAT 502 are contained in non-volatile memory such as NAND flash 504. The GAT 502 may be broken down into a number of equal, fixed size segments. As discussed below, the most active segments may be compressed and brought into the GAT cache 506 in fast access media such as RAM 508. With this arrangement, during random access to the storage device, some sections of the mapping table can be accessed from the RAM 508 or other fast access media.

Figure 6:
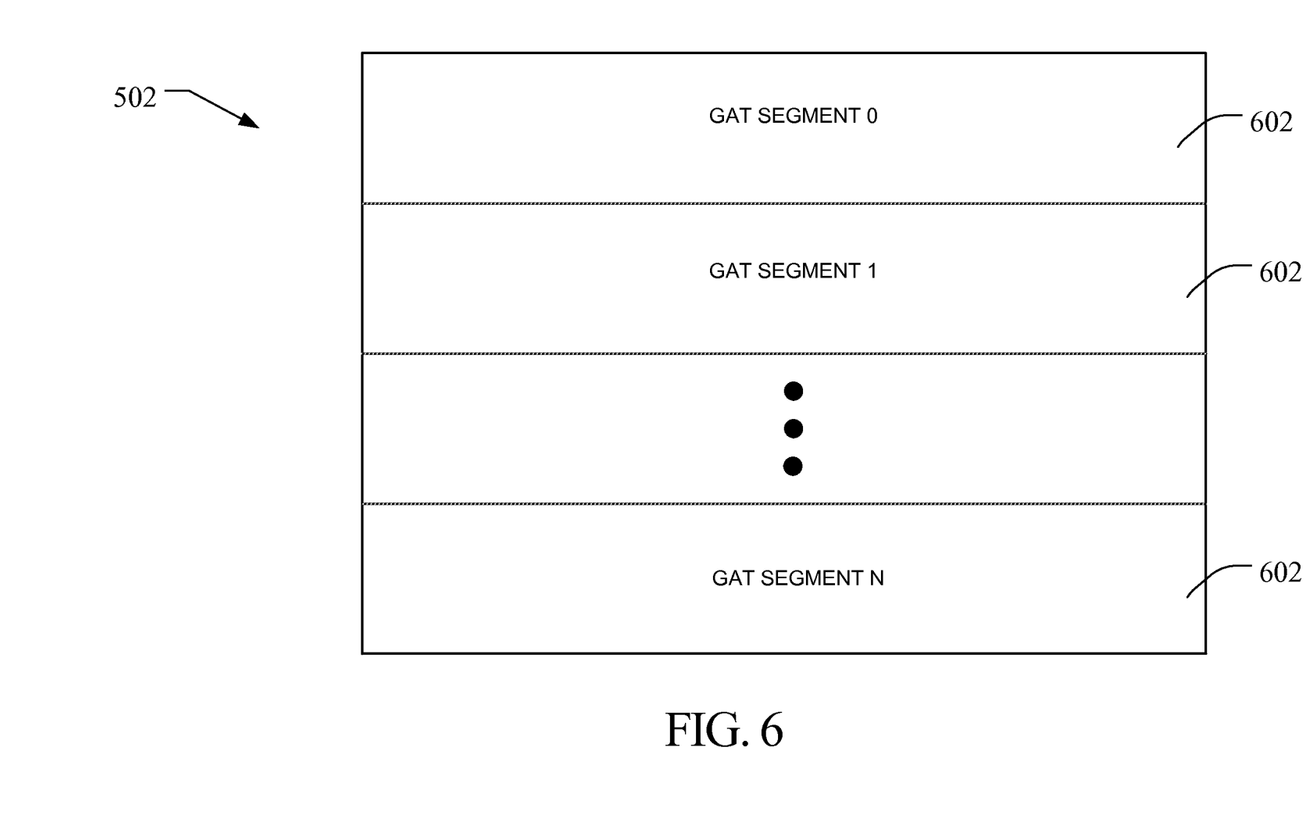
FIG. 6 illustrates one arrangement of the GAT of FIGS. 1 and 5 divided into a whole number of GAT segments.

FIG. 6 shows how the logical mapping space in the GAT 502 may be broken down into N segments 602, each segment having an equal number of LFMUs. In the example of FIG. 6, assuming for discussion purposes a 32 gigabyte addressable storage capacity in the memory 108, the GAT 502 may be broken down into 8,192 GAT segments 602, where each GAT segment includes 1,024 LFMUs. The size selected for the whole number of fixed size GAT segments 602 in the GAT 502 is arbitrary and may be set to any of a number of desirable sizes for the particular memory device. In one embodiment, the size of each LFMU may be set to the smallest size that can be processed by an error correction code mechanism in the memory device, which may be 4 kilobytes (kB) in one example. Each of the 4 kB LFMUs 404 would then include 8 sectors of information (assuming a 512 byte sector) and thus could address 4 megabytes worth of data.

A technique for reducing the problem of slower access to logical to physical mapping data due to portions that are stored only in slower non-volatile memory, such as NAND flash memory, involves compressing the mapping data from the primary mapping table (e.g., the GAT) so that more mapping data can be held in a partial copy of the GAT in RAM (e.g. the GAT cache). In one embodiment, RAM 508 may be in the controller 106 of the storage device 102, such as RAM 114 (FIG. 1).

Figure 7:
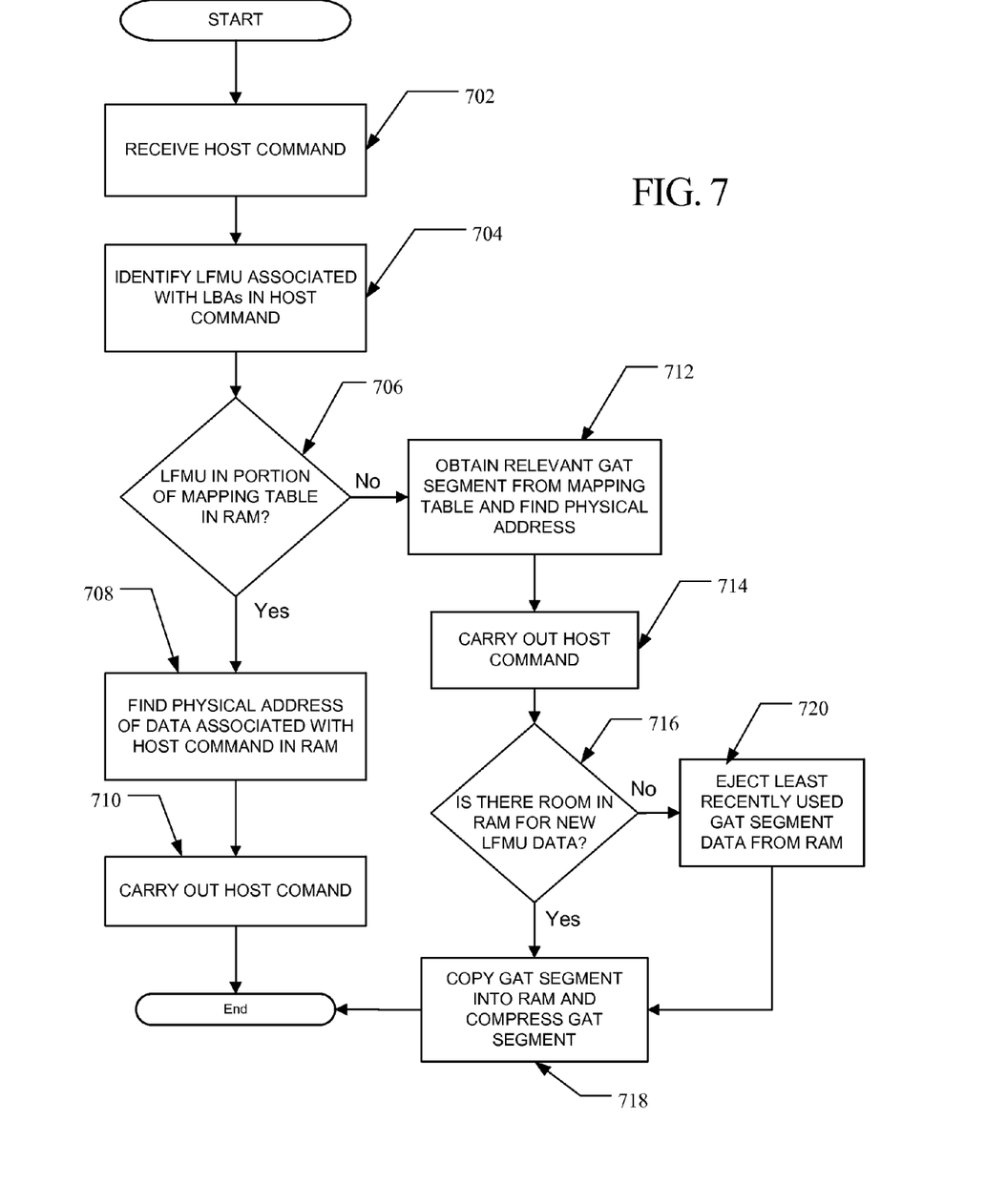
FIG. 7 is a flow diagram of a method for managing logical to physical mapping data during host operations in a storage device such as illustrated in FIGS. 1 and 5.

Referring now to FIG. 7, a method for managing a logical-to-physical mapping table 602 or other mapping data structure is illustrated where a portion the mapping table 502 in NAND 504 may be copied and kept as a fast access table 506 in a GAT cache 506 in RAM 508. In one embodiment, the controller 106 of the storage device 102 receives a host command relating to data having a particular LBA range (at 702). The command may be a host write command, a host read command or any of a number of other host commands necessitating an address look-up in the mapping tables. The controller 106 translates the LBAs into LFMU addresses associated with the LBA range in the host command and then looks to see where the mapping information for those LFMUs is stored (at 704). Because the logical address space is divided into a whole number of equal size GAT segments 602, where each GAT segment 602 contains a known sequential number of LFMUs 404 and each LFMU is associated with a known sequential number of logical block addresses 406, the controller 106 can simply perform an arithmetic operation on the addresses received from the host 100 to determine the GAT segment or segments 602 containing the desired LBAs.

Once the relevant GAT segment(s) 602 is identified, the controller 106 first checks to see if a copy of the GAT segment(s) is already in RAM 114, 508 (e.g. in the GAT cache 136, 506) (at 706). If the GAT cache 136, 506 already contains the mapping table information for the relevant LFMUs, the physical addresses for the data corresponding to the LBAs in the command are obtained and the host command is executed on data assigned to the retrieved physical addresses (at 708, 710). As part of first checking the GAT cache in RAM and seeing that mapping data for the LFMUs implicated by the host command are there, the controller may also determine if there is a more up-to-date address mapping to be found in the GAT delta 138. This information may be available in the LFMU entry in the GAT cache in the form of a flag or other identifier bit stored in the GAT cache entry. An example of one suitable identifier is discussed with respect to FIG. 10 below (see single bit "delta fresh" identifier in FIG. 10). If the identifier does not point to a more recent mapping entry, then the physical address is taken from the mapping entry for the LFMU in the GAT cache. When the identifier in the GAT cache entry indicates a more up-to-date entry exists in the GAT delta 138, then the controller 106 may retrieve that mapping information and carry out the host command.

Alternatively, when the controller 106 does not find mapping information for the relevant LFMUs in the GAT Cache 136, 506, it identifies and obtains the relevant GAT segment 602 from the GAT 502, looks up the physical address needed and carries out the host command (at 712, 714). The controller then determines if there is enough room in RAM 114, 508 for the GAT segment 602 with the relevant LFMUs (at 716). If there is, then the GAT segment 602 is copied into the GAT cache 506 in RAM 114, 508 and compressed (at 718). When the RAM is too full to accept the GAT segment, then a GAT Cache ejection procedure is first executed to eject data from the GAT Cache 506 and make room for the currently desired mapping data (at 720) before copying the GAT segment into the GAT cache in RAM. This ejection mechanism may simply be selecting and ejecting a fixed amount of the least recently used mapping data, regardless of how many GAT segments are encompassed in that fixed amount. For example, assuming a 4 kB uncompressed GAT segment size, if the fixed amount of data to be ejected is set at 4 kB when the RAM is too full, a single uncompressed GAT segment may be ejected or multiple compressed GAT segments up to the 4 kB may be ejected. Any of a number of other ejection amounts, or other ejection algorithms, may alternatively be employed. In one implementation, the RAM is too full when another complete GAT segment will not fit in the current space available in RAM. The controller can then obtain and compress the GAT segment for the relevant LFMUs and store it in the GAT cache in RAM (at 718).

In one implementation, in order to avoid delay in attending to the pending host command, the controller will look up the desired physical address(es) in the relevant GAT segment from the GAT in non-volatile memory before copying that GAT segment to the GAT cache. Also, the compression of the data in the identified GAT segment need not be contemporaneous with the copying of the GAT segment. Instead, the attempt to compress the mapping data of the GAT segment may be delayed for a short time after it is copied into the GAT cache when processing power and response time demands require. For example, the compression steps may be delayed based when looking up the physical addresses and attending to pending host commands.

One compression scheme for compressing a logical group mapping entry from the GAT into the GAT cache is for the controller 106 to search for skip patterns in each GAT segment 602 brought into the GAT cache 136, 506. This skip pattern is a skip pattern in the address entries of logical units for overcoming the problem of "skipped" entries in cases where the user data is not necessarily programmed in a sequential manner (in a strict round robin manner for example). The skip pattern compression process described herein uses the detected skip pattern for compressing the data across the dynamic metablocks accordingly. Specifically, the skip pattern is detected by identifying and recording a recurrence in the skips in a GAT segment of sets of sequential LFMU entries mapped to sequential physical addresses, such as when sequential runs of user data are written in an interleaved pattern across multiple planes or die. As noted above in FIG. 6, a GAT segment 602 is defined herein as the portion of the GAT 502 being copied over into the GAT cache when the LFMUs having the LBAs associated with a host command are not already found in the GAT cache. The identification and recording of a skip pattern is applied in a dynamic manner to use the resulting skips to pare down the number of entries in the mapping table of the GAT cache, as compared to the GAT, for the same GAT segment.

One skip pattern the controller may look for in a GAT segment may be based on a (0/4/12/28) "die-plane interleave". In this embodiment, no skips are defined for a regular run-length compression algorithm; 4 logical units are skipped every 4 logical units in a 2-die-plane interleave memory device; 12 logical units are skipped every 4 logical units in a 4-die-plane interleave memory device; and 28 logical units are skipped every 4 logical units in an 8-die-plane interleave memory device, respectively. Alternatively, when a skip pattern is not detected, the mapping information for the current GAT segment may instead be compressed using a standard run-length compression, or may simply be uncompressed in the GAT cache if no compression is available.

Figure 8:
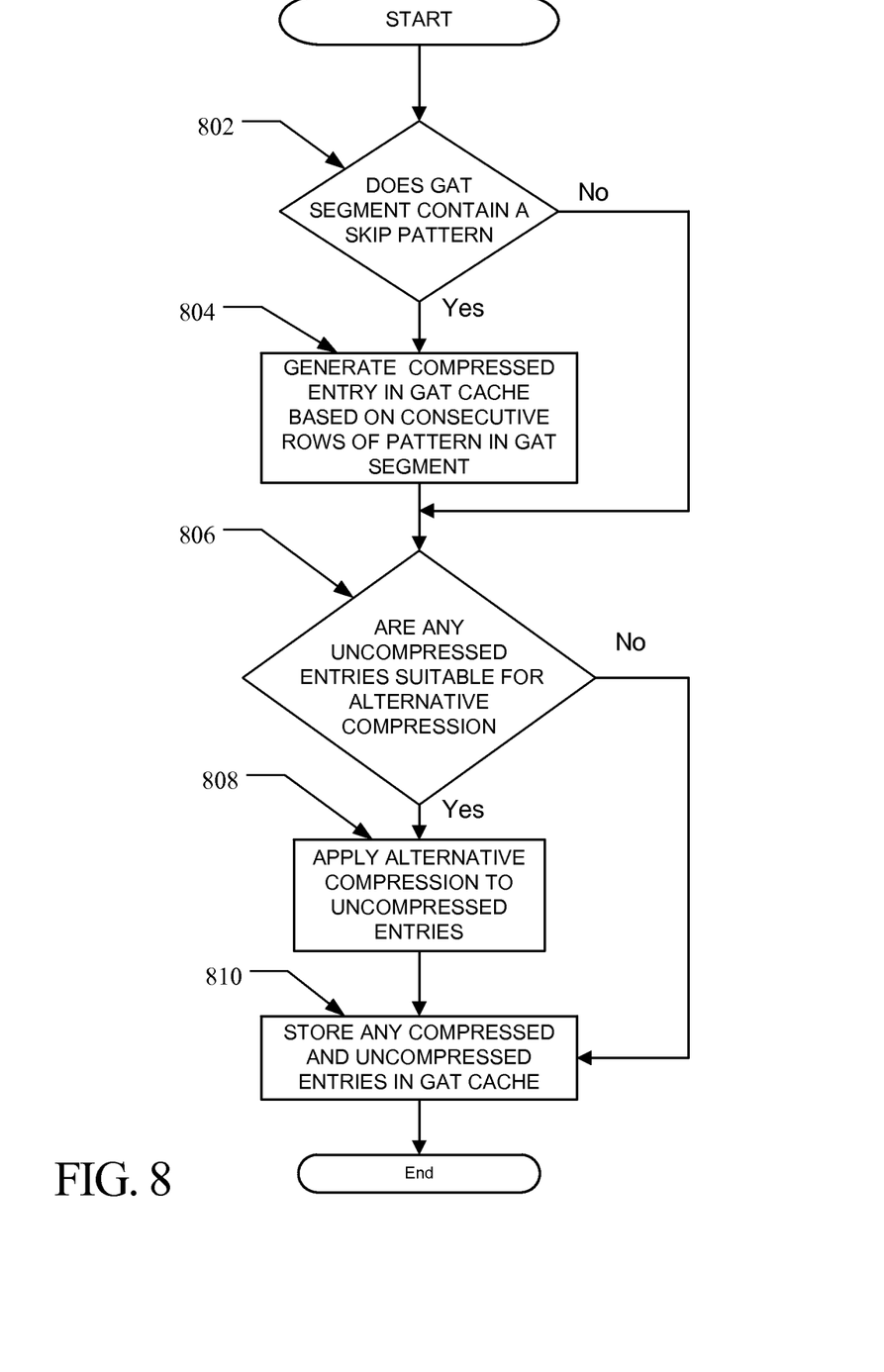
FIG. 8 is a flow diagram of compression techniques usable with the method of FIG. 7.

Referring to FIG. 8, the process of compressing the copied GAT segment (see step 718 of FIG. 7) is set forth. The controller 106 first reviews the GAT segment 602 to see if a skip pattern compression technique will work (at 802). As noted above, the skip pattern compression technique is based on detecting patterns of mapping data in the GAT segment resulting from longer sequential writes of data in a non-volatile memory that uses interleaving between planes or die. For example when user data is received at the memory device 102 and stored in memory 108, the pattern of writes may be an interleave pattern where a page of data for each of four different physical blocks may be written in sequence so that the first page of the block in the first die on the first plane is written and then three pages worth of data for three other physical blocks are written to respective other planes in other die (or the same die if that die has multiple planes) and then the process is repeated for the next page of each plane/die where the more user data is written to the second page of the first plane in the first die block and so on.

For long sequential writes from the host that are interleaved in such a manner, instead of having individual entries for each of the LFMUs in each page (uncompressed as in the GAT), or one entry for each page (compressed using a run-length compression), the skip pattern of sequential rows in the GAT segment may be used to further reduce the number of entries so that more GAT segments may fit into the limited RAM available for the GAT cache. Thus, for a four plane non-volatile memory (such as illustrated in planes 200, 202, 204 and 206 in FIG. 2) the interleave pattern would, for sequential data, store user data for four separate blocks in respective planes by writing one page at a time for each of the blocks before storing a next page for each of the respective blocks in their respective planes. The logical-to-physical mapping table of the GAT would reflect this same pattern for each plane (four sequential bursts of mapping data, one for each page in each plane in this 4 plane example), one for each page, that repeats in subsequent rows of each GAT segment 602 in the GAT 502. The skip pattern compression entry based on the repeated pattern of skipped sequential runs in each row of the GAT segment would then be recorded in the GAT cache to reduce the size of the mapping data for the GAT segment previously identified and copied into the GAT cache (at 804).

In instances where there is no skip pattern in the GAT segment due to the lack of sequentially written user data, or if only a portion of the GAT segment contains skip patterns, then another compression technique may be applied to any uncompressed entries from the GAT segment if the uncompressed entries are suitable for compression (at 806, 808). One other compression technique is a standard run-length compression where shorter runs of sequential PFMUs in the LFMUs may be compressed by identifying the first LFMU associated with the first PFMU of the sequential run and the run length, rather than individual entries for each LFMU in the run. Other compression techniques are also contemplated. After applying the compression technique or techniques suitable for the mapping data from the GAT segment, any compressed an uncompressed entries would then be stored in the GAT cache (at 810). Assuming that the skip pattern compression was appropriate for the particular GAT segment 602, less space would now be taken up by the compressed mapping data in the RAM and the RAM would have more space for additional portions of data from the GAT.

Figure 9:
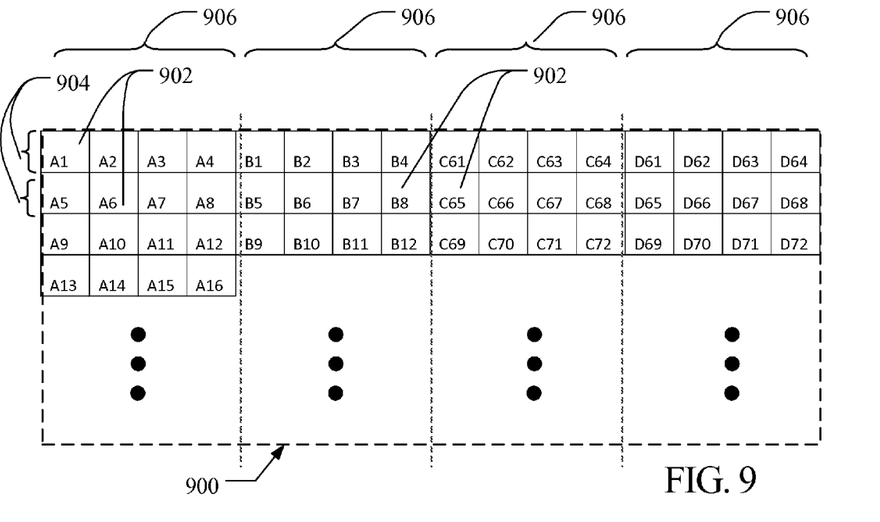
FIG. 9 is an example of one pattern of mapping data in a GAT segment of the GAT table of FIGS. 1 and 5.

One implementation of a skip pattern analysis is illustrated with respect to FIG. 9. FIG. 9 shows a portion of a GAT segment 900 in the GAT that is to be copied into the GAT cache. In this example, it is again assumed that the non-volatile memory is composed of 4 planes (in any combination such as 4 die with 1 plane each or 2 die with 2 planes each) of non-volatile memory cells, such as NAND memory cells. In the example of FIG. 9, the full GAT segment 900 would contain 1,024 LFMU's, but only a portion of the contents of the GAT segment 900 is shown for ease of illustration. In the portion of the GAT segment 900 shown, each of the cells 902 represents a logical flash memory unit (LFMU or logical unit) and each LFMU is mapped to a respective physical flash management unit (PFMU or physical unit) (represented by the designators A1-A16, B1-B12, C61-C72 and D61-D72). The LFMUs are numbered sequentially by row 904 such that LFMU 0 is associated with physical unit A1 and LFMU 15 is associated with PFMU D64 in this example. The second row 904 in this GAT segment 900 would then begin with LFMU 16 (mapped to PFMU A5) and end in LFMU 31 (mapped to D68), and so on. The controller 106 of the storage device 102 is also aware of the interleave scheme used for data writes into the non-volatile memory, for example the flash memory die write interleave pattern. For ease of illustration, dashed lines are included in FIG. 9 to show where mapping data in the GAT segment 900 corresponds to each of the 4 different planes (or die) in the non-volatile memory of this example.

The skip count of the compression scheme may make use of the fact that planes within the same die share the same page and physical unit (PFMU) numbers. The controller 106 implements the compression scheme to identify and record a recurrence in the skips of LFMU entries per die (or per plane), thus taking advantage of the resulting skips to reduce the number of entries in the compressed mapping table in the GAT cache 136, 506. In one implementation, the compression scheme detects only full rows 904 of consecutive LFMUs sharing the same skip pattern, where a full interleaved write of user data across one physical page of each plane/die corresponds with a complete row 904 of the GAT segment 900. Thus, each row 904 of the GAT segment 900 is the address information for a physical page in each of the physical blocks in the NAND memory. In the example of FIG. 9, each row 904 is 4 pages, where each group 906 of four LFMUs corresponds to a different die/plane page in the non-volatile memory 120 due to the write interleave pattern of user data into the non-volatile memory 120.

In the example of FIG. 9, the controller 106 executes instructions 116 to implement the compression scheme to identify a skip pattern having four "skip 12" entries (A1-A12, B1-B12, C61-C72, D61-D72) and one "no skip" entry (A13-A16). The four "skip 12" entries will be treated as a set. The skip 12 pattern is seen from the run of four PFMUs (A1-A4) in the first four LFMUs, followed by 12 LFMUs in other partitions before starting the next row 904 of the GAT segment 900 where a group 906 of four more PFMUs (A5-A8) that are sequential PFMUs with A1-A4 reside. This pattern of skips in LFMUs between contiguous and sequential PFMU runs continues for three complete rows 904 of the GAT segment 900 in this example, so all of the sequential PFMU run (A1-A12) in the first three rows 904 of the GAT segment 900 may be compressed into one compressed entry for the GAT cache 136, 506 in RAM 114, 508. The same analysis applies to the sequential and contiguous PFMU runs for B1-12, C61-C72 and D61-D72.

The last group 906 of sequential PFMUs (A13-A16), because it is not part of a complete row 904 in the GAT segment 900, would not be part of the skip 12 pattern identified in the compression algorithm because it is not part of a complete row 904 of LFMU to PFMU mapping data used in the GAT segment 900. This last group 906 of PFMUs in GAT segment 900 may instead be compressed to its own separate single entry in the GAT cache 136, 506 using a standard run-length algorithm identifying the first LFMU and the first PFMU of the sequential run. The length of the run-length compression need not be recorded as it can be calculated by subtracting the first LFMU index of that entry from the first LFMU index of the next entry in the GAT cache. Thus, using the skip pattern compression analysis of LFMUs skipped between sequential runs of PFMUs on a row-by-row basis in the GAT segment 900, the total number of entries is reduced to five in this example. This is a significant savings in the number of individual entries (here, 52 entries of the 1024 entries for the GAT segment are shown) in the GAT segment for recording each individual LFMU to PFMU. This also provides a better compression than standard run-length compression that, in the example of FIG. 9, would result in 13 entries (one for each run of four contiguous PFMUs) into the compressed mapping table of the GAT cache 136, 506.

Figure 10:
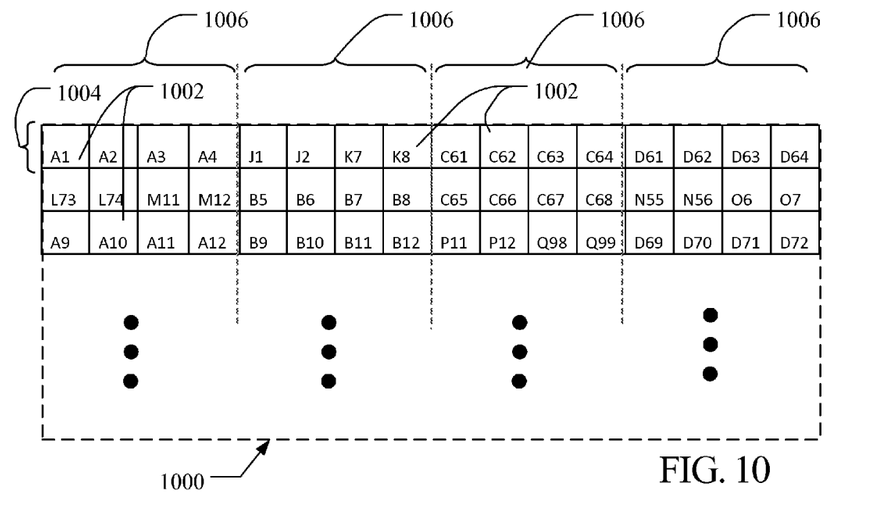
FIG. 10 is an example of an alternate pattern of mapping data in a GAT segment of FIG. 8.

Unlike the generally ideal example of FIG. 9, where long runs of sequentially written host data result in an interleave pattern recorded in the GAT 134, 502 (and thus in GAT segments) where at least multiple adjacent rows 902 of the GAT segment 900 include groups 906 of repeated patterns that may be compressed in a highly efficient manner, FIG. 10 illustrates a GAT segment 1000 for a more random host write pattern that has resulted in no sequential data runs sufficient to generate a repeated pattern in two or more consecutive rows 1002 of the GAT segment 1000. If the GAT segment 1000 of FIG. 10 was retrieved from the GAT for compression into the GAT cache, then no skip pattern compression would be available. No consecutive rows 1002 of the GAT segment 1000 include contiguous and sequential runs of PFMUs for each entire row 1002, so no skip pattern is available another compression scheme would be necessary to compress the logical-to-physical mapping data of this GAT segment 1000. Assuming that the standard run-length compression algorithm mentioned above was used, then the number of compressed entries in the GAT cache from this GAT segment 1000 would be 16:

1) A1-A4
2) J1-J2
3) K7-K8
4) C61-C64
5) D61-D64
6) L73-L74
7) M11-M12
8) B5-B8
9) C65-C68
10) N55-N56
11) O6-O7
12) A9-A12
13) B9-B12
14) P11-P12
15) Q98-Q99
16) D69-D72

An advantage of the skip pattern compression scheme discussed with respect to FIG. 9 above is that it may be used without any other compression schemes, where entries generated in the GAT cache from the GAT would only include skip pattern compressed entries and/or uncompressed entries. Alternatively, the skip pattern compression technique described above may be used in combination with any of a number of non-skip pattern compression techniques (as discussed in FIG. 10 above) such that the resulting compressed table in the GAT cache may contain skip compression entries and/or entries compressed by run-length compression or other techniques. Although technically the GAT cache entries may be for skip pattern compressed entries, run-length compressed entries and uncompressed entries, a more accurate description is that a portion of the entries is kept in skip-pattern compression and a portion in run-length compression because an entry with run length of one is effectively uncompressed.

Figure 11:
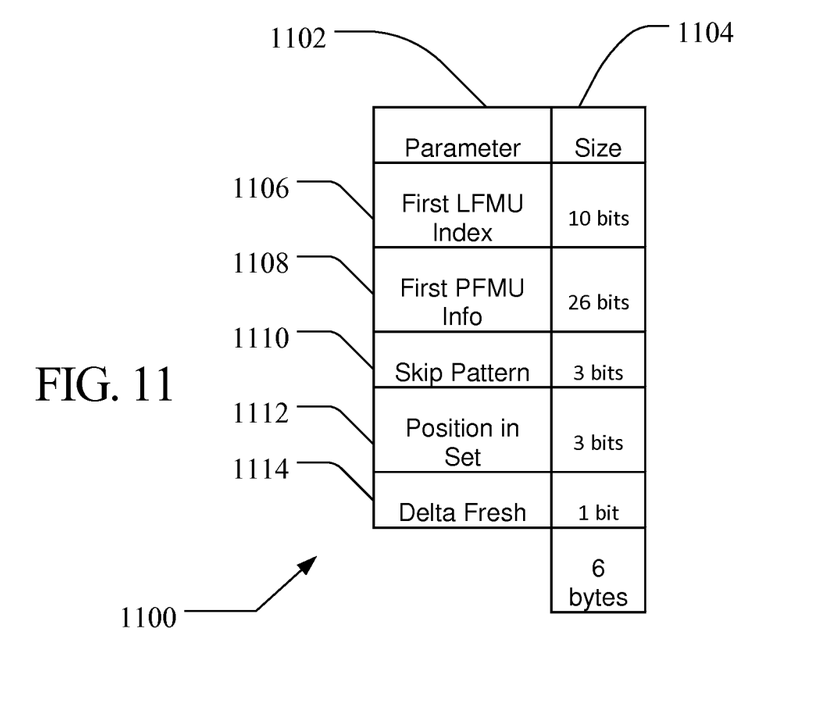
FIG. 11 shows an embodiment of a data entry in a GAT cache page suitable for use with skip pattern compression in the GAT cache page.

An example of a mapping table entry format 1100 for compressed mapping table entries generated by the controller from the GAT 134, 502 and stored in RAM 144, 508 in the GAT cache 136, 506 is illustrated in FIG. 11. The skipped pattern compression table entry format 1100 may include multiple parameters 1102, each having a specified size range 1104. The first parameter may be the first LFMU index number 1106 identifying the LFMU offset within the GAT segment 602. In one implementation, first LFMU index number parameter 1106 may be sized for index numbers in a range that permits indexing a GAT segment of up to 1,024 LFMUs (e.g. 4 kilobytes). If the skip pattern is for a set sharing the same skip pattern, as was the case in the example of FIG. 9, then all the entries of the set may list the first LFMU of the set (LFMU 0), not of the individual entry. The next parameter in the format 1100 may be the first PFMU information 1108 that identifies the die, block, plane and PFMU offset for the first PFMU associated with the LFMU.

A skip pattern parameter 1110 identifies the number of LFMUs skipped between sequential and contiguous PFMU runs. For example, the skip pattern parameter 1110 would indicate a skip of 12 for the GAT segment example of FIG. 9 and a skip of 0 for the GAT segment example of FIG. 10. The skip pattern parameter 1110 may indicate a skip of 0, 4, 8, 12, 16, 20, 24 or 28 LFMUs depending on the die-plane configuration of the non-volatile memory. Although three bits are suggested for the size of this parameter, it could be reduced to two bits for memories having 4 dies-times-planes or less. A "position in set" parameter 1112 is also included in the compressed entry to identify a relative position of this entry within the set of 2, 4 or 8 consecutive entries sharing the same skip pattern, where the 2, 4 or 8 consecutive entries correspond to the 2, 4 and 8 die-plane interleave patterns for data writes supported by the compression algorithm. This parameter allows the controller to easily know which are the entries immediately preceding and following the set for the purposes of binary searching. As with the skip pattern parameter 1110, the position in set parameter size can be reduced to 2 bits for storage devices with 4 dies-times-planes or less. Finally, the skipped pattern compression table entry format 1100 may include a one bit GAT delta indicator ("delta fresh") 1114 to flag whether the compressed entry in the GAT cache is up-to-date vis-à-vis the GAT delta 138. More specifically, when the GAT delta 138 is updated for data relating to LBAs in one of the LFMUs present in the GAT cache 136, the delta fresh indicator for the corresponding entry in the GAT cache is updated to indicate that the most recent logical-to-physical mapping is not found in the GAT cache (and is instead in the GAT delta).

In the example of FIG. 11, the overall entry size for an entry in the GAT cache using the skipped pattern compression procedure discussed above may be 6 bytes (or 5 bytes in storage devices with 4 dies-times-planes or less). The size of the parameters and overall entry, as well as the number of parameters utilized, may be varied in other embodiments. It should be noted that the length of the logical unit (LFMU) is not part of the entry 1100 since it can be deduced by comparing the First LFMU Index 1106 of one entry with that of the entry immediately following it (or immediately following its set) in the GAT cache. Also, this same entry format 1100 may be used for entries in the GAT cache that are compressed using the skip compression technique and for entries that utilize a run-length compression. For uncompressed entries, the default GAT entry format of the uncompressed mapping data in the GAT segment 602 may be used and recorded in the GAT cache rather than the compressed format of FIG. 11.

A system and method has been disclosed for compressing a portion of mapping data from a logical-to-physical mapping data structure, such as a GAT stored in non-volatile memory, and storing that compressed mapping data in a fast access volatile memory, such as in a GAT cache in DRAM. The compression may be a skip pattern compression that takes advantage of repeated patterns in mapping entries in the GAT for sequential runs of host data that are written into non-volatile memory in an interleaved fashion. For storage devices with limited volatile memory within which to store some of the mapping table information from non-volatile memory, the skip pattern compression increases the range of mapping data that can be stored in the faster, but size-limited, volatile memory. Although the compression may add to the time it takes to read the portion of mapping table compressed into the volatile memory as compared to uncompressed mapping table information, it may improve overall cache performance by increasing the amount of mapping information available in the volatile memory and therefore reducing the need to evict and pull in additional mapping table information to the volatile memory.

The methods described herein may be embodied in instructions on computer readable media. "Computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a processor, memory device, computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

It is therefore intended that the foregoing detailed description be regarded as illustrative rather than limiting, and that it be understood that it is the following claims, including all equivalents, that are intended to define the spirit and scope of this invention.

What is claimed is:

1. A method of managing a memory device comprising:
in a memory device having a non-volatile memory, a volatile memory and a controller in communication with the non-volatile memory and the volatile memory, the controller:
receiving a host command identifying a logical block address for data stored in non-volatile memory of the memory device;
determining if mapping information regarding a physical address in the non-volatile memory associated with the logical block address resides in the volatile memory;
when no mapping information associated with the logical block address resides in the volatile memory:
retrieving a segment of mapping information from a logical-to-physical mapping structure in the non-volatile memory, the segment associated with the logical block address in the host command;
compressing the segment of mapping information into a compressed logical group address entry based on a logical address skip pattern in physical address entries associated in the segment; and
storing the compressed segment of mapping information in the volatile memory.

2. The method of claim 1, wherein the logical address skip pattern comprises a plurality of groups of sequential runs of logical addresses associated with sequential physical addresses in a first row of the segment that is contiguous with a second plurality of groups of sequential runs of logical addresses associated with sequential physical addresses in a second row of the segment.

3. The method of claim 1, wherein the segment comprises a portion having the logical address skip pattern and a portion without the logical address skip pattern, and wherein storing the compressed segment of mapping information comprises storing mapping information for the portion having the logical address skip pattern in a compressed format and storing the portion without the logical address skip pattern in an uncompressed format.

4. The method of claim 1, wherein the segment comprises a portion having the logical address skip pattern and a portion without the logical address skip pattern, and wherein storing the compressed segment of mapping information comprises:
storing mapping information for the portion having the logical address skip pattern in a compressed format;
determining if the portion without the logical address skip pattern is compressible using a different compression method;
storing any of the portion without the logical address skip pattern that is compressible using the different compression method; and
storing in an uncompressed format any remainder of the portion without the skip pattern that is not compressible using the different compression format.

5. The method of claim 1, wherein retrieving the segment of mapping information from the logical-to-physical mapping structure in the non-volatile memory comprises first determining if room is available in the volatile memory for the segment of mapping information and, if insufficient room is available, ejecting a previously retrieved segment of mapping information from the volatile memory prior to retrieving the segment of mapping information associated with the logical block address in the host command.

6. The method of claim 5, wherein ejecting the previously retrieved segment comprises selecting the least recently used segment of mapping data in the volatile memory for ejection and erasing the least recently used segment from the volatile memory.

7. A memory device comprising:
a non-volatile memory;
a volatile memory; and
a controller in communication with the non-volatile memory and the volatile memory, wherein the controller is configured to:
receive a host command identifying a logical block address for data stored in non-volatile memory of the memory device;
determine if mapping information regarding a physical address in the non-volatile memory associated with the logical block address resides in the volatile memory;
when no mapping information associated with the logical block address resides in the volatile memory:
retrieve a segment of mapping information from a logical-to-physical mapping structure in the non-volatile memory, the segment associated with the logical block address in the host command;
compress the segment of mapping information into a compressed logical group address entry based on a logical address skip pattern in physical address entries associated in the segment; and
store the compressed segment of mapping information in the volatile memory.

8. The memory device of claim 7, wherein the volatile memory comprises random access memory (RAM) and the non-volatile memory comprises flash memory.

9. The memory device of claim 8, wherein the logical address skip pattern comprises a plurality of groups of sequential runs of logical addresses associated with sequential physical addresses in a first row of the segment that is contiguous with a second plurality of groups of sequential runs of logical addresses associated with sequential physical addresses in a second row of the segment.

10. The memory device of claim 9, wherein the segment comprises a portion having the logical address skip pattern and a portion without the logical address skip pattern, and wherein to store the compressed segment of mapping information the controller is configured to store mapping information for the portion having the logical address skip pattern in a compressed format and store the portion without the logical address skip pattern in an uncompressed format.

11. The memory device of claim 7, wherein the segment comprises a portion having the logical address skip pattern and a portion without the logical address skip pattern, and wherein to store the compressed segment of mapping information the controller is further configured to:
store mapping information for the portion having the logical address skip pattern in a compressed format;

determine if the portion without the logical address skip pattern is compressible using a different compression method;

store any of the portion without the logical address skip pattern that is compressible using the different compression method; and store in an uncompressed format any remainder of the portion without the skip pattern that is not compressible using the different compression format.

12. The memory device of claim 11, wherein the different compression method comprises a run-length compression method.

13. The memory device of claim 7, wherein to retrieve the segment of mapping information from the logical-to-physical mapping structure in the non-volatile memory, the controller is configured to first determine if room is available in the volatile memory for the segment of mapping information and, if insufficient room is available, to eject a previously retrieved segment of mapping information from the volatile memory prior to retrieving the segment of mapping information associated with the logical block address in the host command.

14. The memory device of claim 7, wherein the controller is configured to, in order to eject the previously retrieved segment, select the least recently used segment of mapping data in the volatile memory for ejection and erase the least recently used segment from the volatile memory.

* * * * *